United States Patent
Borrego

Patent Number: 6,153,999
Date of Patent: Nov. 28, 2000

[54] ROBOTIC LIBRARY DEAD RECKON TARGETING

[75] Inventor: Antonio Borrego, Louisville, Colo.

[73] Assignee: Storage Technology Corporation, Louisville, Colo.

[21] Appl. No.: 09/293,402

[22] Filed: Apr. 16, 1999

[51] Int. Cl.[7] .................................................. G11B 15/68
[52] U.S. Cl. ...................... 318/568.11; 318/561; 360/92; 360/93
[58] Field of Search ..................... 318/560, 561, 318/568.11, 568.21–568.24; 901/30–35; 414/274, 267, 276, 277, 331, 273, 281, 751, 730; 211/41.12, 41.17, 41.18; 360/71, 92, 85, 75, 93, 98.06; 294/86.4; 395/82, 80, 84; 369/34, 38, 30, 178

[56] References Cited

U.S. PATENT DOCUMENTS

| | | | |
|---|---|---|---|
| 4,566,087 | 1/1986 | Kraft | 369/34 |
| 4,636,135 | 1/1987 | Bancon | 414/730 |
| 4,907,889 | 3/1990 | Simone | 360/92 |
| 5,242,259 | 9/1993 | Yeakley | 414/751 |
| 5,285,333 | 2/1994 | Barr et al. | 360/92 |
| 5,429,470 | 7/1995 | Nicol et al. | 414/331 |
| 5,479,581 | 12/1995 | Kleinschnitz | 395/82 |
| 5,742,445 | 4/1998 | Inazawa et al. | 360/71 |
| 5,963,514 | 10/1999 | Kanetsuku et al. | 369/34 |
| 6,023,391 | 2/2000 | Yamakawa et al. | 360/92 |

*Primary Examiner*—Paul Ip
*Attorney, Agent, or Firm*—Brooks & Kushman P.C.

[57] ABSTRACT

An apparatus and a method for providing fine alignment of a robotic assembly with multiple storage cells in a storage library system. One or more docking targets are fixed inside the library in a predetermined orientation with respect to the cells. One or more mating members are attached to the robotic assembly's hand. The mating members and docking targets are shaped to be self-aligning when pressed together. In operation the robotic hand is coarsely aligned with a selected cell. Next, the robotic hand is moved toward the selected cell causing the mating member(s) to engage with the docking target(s) associated the selected cell. The transverse force produced by the robotic hand pushing the mating member(s) against the docking target(s) causes further alignment. When the mating member(s) is fully aligned with the docking target(s) the robotic hand is finely aligned with the selected cell.

26 Claims, 4 Drawing Sheets

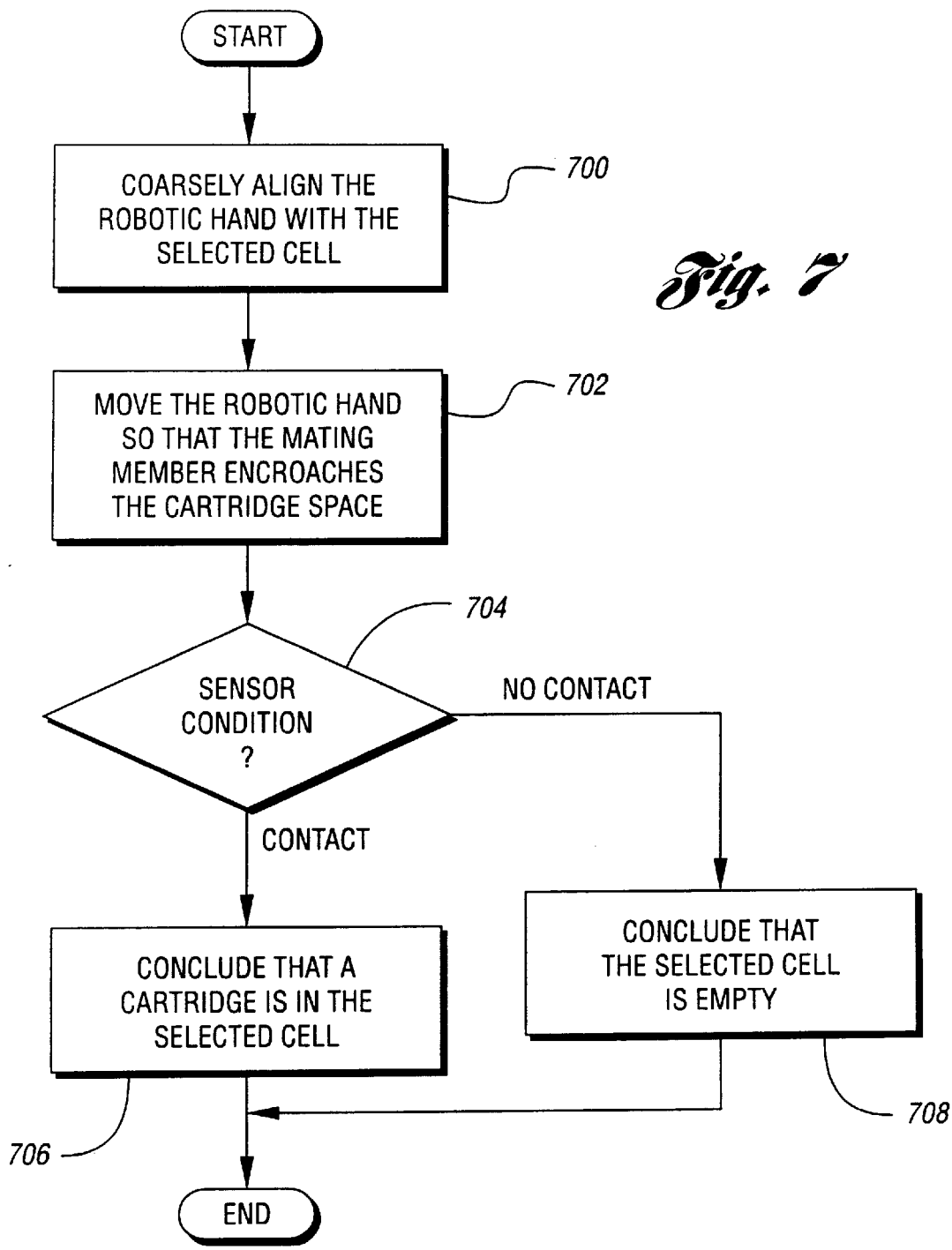

ROBOTIC LIBRARY DEAD RECKON TARGETING

TECHNICAL FIELD

The present invention relates to the field of mechanical mechanisms and methods for aligning a robotic hand with a selected storage cell in a storage library system.

BACKGROUND ART

Storage library systems are used for storage and retrieval of data contained in cartridges stored in multiple cells within the library. At the core of the storage library system is a robotic assembly having a gripper for grasping the cartridges during moves between the cells and read/write drives. The cells of the library are usually arranged in a cylindrical pattern with the robotic assembly residing at the center. The robotic assembly includes a central column about which the rest of the assembly rotates to align with the desired column of cells. A carriage moves up and down the central column carrying a robotic hand to the selected cell. The robotic hand moves radially relative to the central column to insert and/or remove a cartridge from the selected cell.

Robotic assemblies commonly use velocity and/or relative position sensors to achieve the necessary alignment accuracy over the entire range of the storage library system at a reasonable cost. These sensors require the robotic assembly to be calibrated upon power-up and during reset operations. The calibration is accomplished by moving the robotic assembly to a known home position where a controller zeros the robotic assembly's absolute position. After the calibration, the controller can move the robotic assembly to the position of each cell in the storage library system.

In practice, no two storage library systems are alike. Mechanical tolerances, vibrations, settling effects, external stimulus, and other effects shift the actual position of the cells away from their theoretical or desired positions. Many systems accommodate these differences with vision subsystems that detect optical targets integrated into cell magazines. Feedback from the vision subsystem allows the robotic assembly to adjust for any alignment errors. The vision subsystem also read the bar codes from the cartridges allowing the controller to verify that the correct cartridge is in the cell being addressed.

Vision subsystems are expensive making them undesirable for small, low cost storage library systems. What is sought by storage library system manufactures is a low-cost mechanism to align the robotic assembly with the cells. The task of reading the bar codes on the cartridges may be allocated to the user to further reduce costs.

DISCLOSURE OF INVENTION

The present invention is a low-cost apparatus and a method for providing fine alignment of a robotic assembly to each cell in a storage library system. One or more mechanical docking targets are fixed inside the library having a predetermined orientation with respect to the cells. One or more mating members are attached to the robotic assembly. The mating members and docking targets are shaped to be self-aligning when engaged with each other.

In operation a robotic hand is first coarsely aligned with a selected cell. Next, the robotic hand is moved toward the selected cell causing the mating member to engage with the docking target associated with the selected cell. The transverse forces produced by the robotic hand pushing the mating member into the docking target will cause them to align. When the mating member is fully aligned with the docking target then the robotic hand is aligned with the selected cell.

In the preferred embodiment, the mating member is a plunger protruding beyond the grippers of the robotic hand, and the docking targets are cavities. This arrangement also allows the mating member to be used to interrogate the selected cell for the presence of a cartridge. The operation starts by coarsely aligning the mating member with the selected cell. The robotic hand is then moved toward the selected cell until the mating member encroaches an area normally occupied by the cartridge. Sensors on the mating member and/or robotic hand indicate when the mating member contacts the cartridge. If the sensors do not indicate contact with a cartridge, then the robotic assembly concludes that the cell is empty.

One or more home position docking targets may be included for calibrating the robotic assembly's position. Once calibrated, absolute position may be determined by counting pulses from a relative position sensor, integrating velocity signals over time, or calculating position based upon acceleration and time.

One docking target may be used for aligning the robotic hand to several cells. A drive mechanism is included between the mating member and the robotic hand to choose among the several cells. The drive mechanism offsets the relative position between the mating member and the robotic hand by an integer number of cells.

Accordingly, it is an object of the present invention to provide an apparatus and method for aligning a robotic assembly with the individual cells of a multiple storage cells arrangement using one or more docking targets in fixed positions with respect to the cells. The robotic assembly is equipped with one or more mating members that self-align to the docking targets when the two are pressed together.

Another object of the present invention is to provide a storage library system that includes one or more docking targets in fixed positions with respect to the cells within the system. The robotic assembly of the system includes one or more mating members that self-align to the docking targets when the two are engaged with each other.

Yet another object is to provide a method of interrogating a cell using the mating member attached to the robotic assembly to determine if a cartridge is present in the cell.

These and other objects, features and advantages will be readily apparent upon consideration of the following detailed description in conjunction with the accompanying drawings.

BRIEF DESCRIPTION OF DRAWINGS

FIG. 7 is a flow diagram of a process for interrogating a cell for the presence of a cartridge.

BEST MODE FOR CARRYING OUT THE INVENTION

Figure 1:
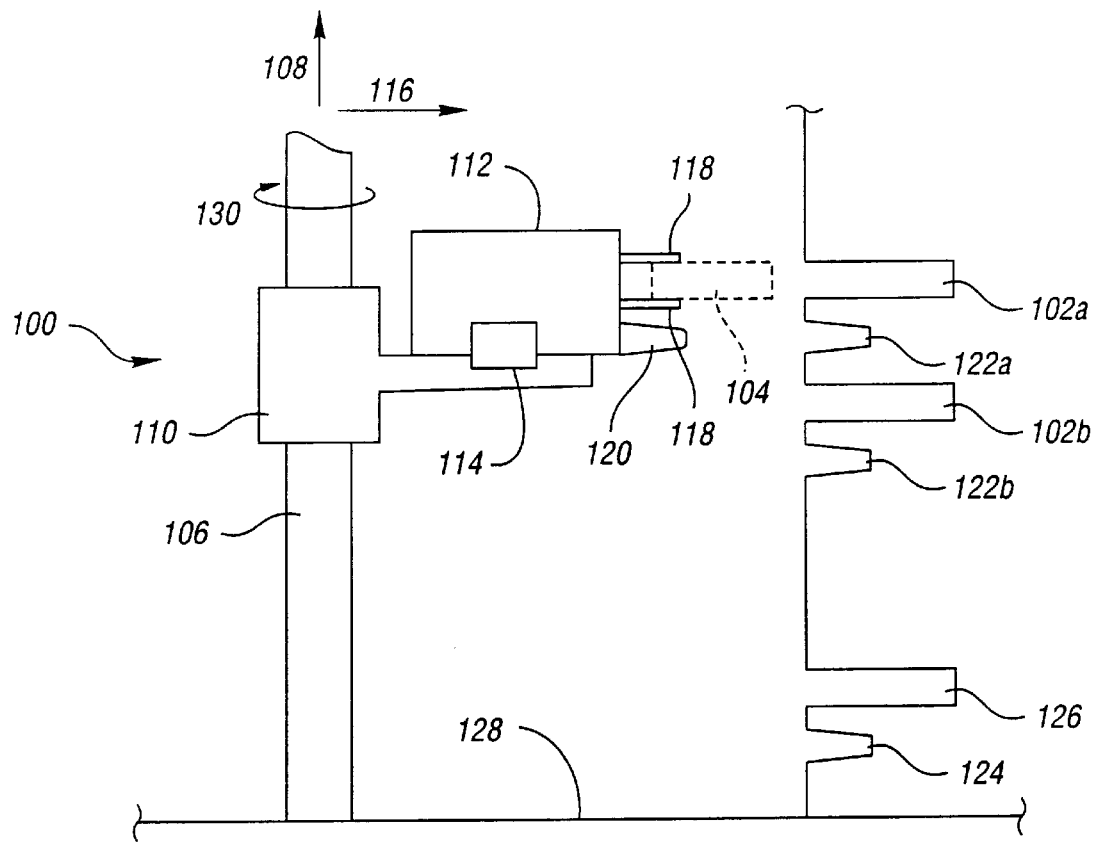
FIG. 1 is a fragmentary elevated side view of the robotic assembly and several cells, the robotic assembly includes one mating member and each cell has one docking target.

Referring to FIG. 1, the storage library system includes a robotic assembly 100 surrounded by multiple cells 102a–b. The robotic assembly 100 moves cartridges 104 (shown in phantom) between cells 102, read/write drives (not shown), and an access ports (not shown).

Robotic assembly 100 consists of a column 106 positioned at the center of a cylindrical storage library system and oriented concentric with a Z-axis 108. A carriage 110 moves up and down and rotates around column 106. A robotic hand 112 is carried on carriage 110. Drive assembly 114 move the robotic hand 112 relative to the carriage 110 in a radial direction 116 toward and away from the cells 102. The robotic hand 112 has a pair of grippers 118 for gripping and holding the cartridge 104. A mating member 120 is coupled to the robotic hand 112 below the pair of gripper 118.

Each cell 102a–b has an associated docking target 122a–b. Docking targets 122a–b are positioned below the respective cell 102 and facilitate the positioning of the mating member 120a–b respectively. A special home docking target 124 may be provided at a home position for calibration purposes. Cavity 126 provides clearance for the pair of grippers 118 while the robotic assembly 100 is at the home position.

The absolute position of the pair of grippers 118 is defined as the height above the floor 128, the angular displacement theta 130 relative to the home position about the Z-axis 108, and a displacement in the radial direction, indicated by arrow 116, from the Z-axis 108. Height above floor 128 is measured by a sensor embedded in carriage 110. Angle theta 130 is measured by a second sensor also embedded in carriage 110. The radial displacement is measured by a third sensor 132 embedded within drive assembly 114. In the preferred embodiment, these sensors are relative position/angle sensors. Relative position/angle type sensors provide one output pulse for each unit distance/angle of movement. Distance/angle is calculated by counting the number of pulses. Velocity is determined by the frequency of the pulses. Alternatively, or in combination with the preferred sensors, absolute position/angle sensors, velocity sensors, and acceleration sensors may be used.

Figure 2:
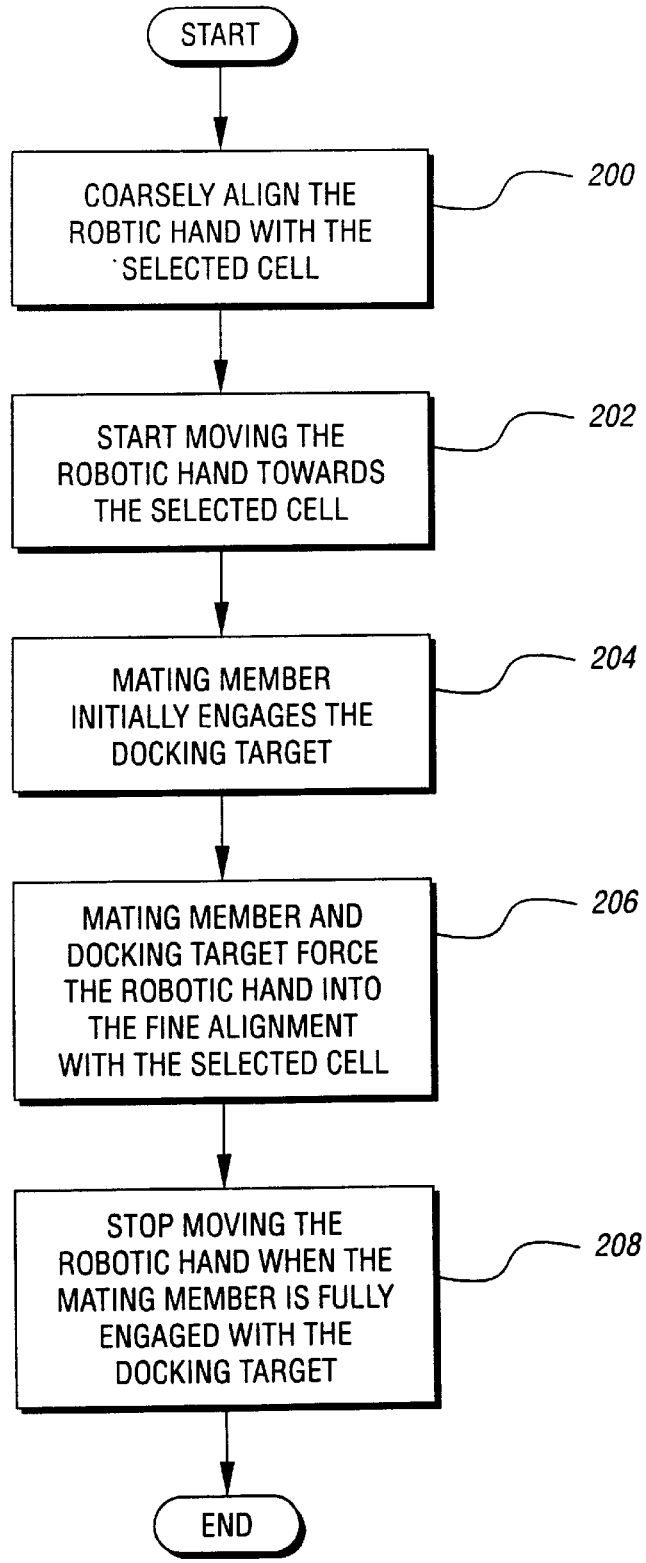
FIG. 2 is a flow diagram of a process for aligning the robotic hand with a selected cell.

FIG. 2 is a flow diagram of the process of aligning the robotic hand 112 with a selected cell 102. The process starts by coarsely aligning the robotic hand 112 with the selected cell 102, as shown in block 200. In this position the mating member 120 is roughly aligned with docking target 122. Robotic hand 112 is then started in motion toward the selected cell 102, as indicated in block 202. Mating member 120 and docking target 122 eventually engage each other, as shown in block 204. As robotic hand 112 continues to move toward the selected cell 102, docking target 122 will force mating member 120 to move transversely into an alignment position. Since mating member 120 is rigidly coupled to the robotic hand 112, the robotic hand 112 will be forced into fine alignment with the selected cell 102, as indicated in block 206. Robotic hand 112 movement is stopped, block 208, once the docking target 122 and mating member 120 are fully engaged.

Detecting when the docking target 122 and the mating member 120 are fully engaged can be accomplished in several ways. When the docking target 122 and mating member 120 are fully engaged, they act as a mechanical stop that stalls the drive mechanism 114. Any combination of position, velocity and acceleration sensors may be used to provide feedback that the drive mechanism 114 for the robotic hand 112 has stalled. An open loop approach is to drive the robotic hand 112 in the radial direction 116 for a predetermined time, as measured by timer 134, selected such that the robotic hand 112 may travel the maximum distance possible in the radial direction 116. Still, another approach is to place a pressure sensor or a displacement sensor between the robotic hand 112 and the mating member 120. The output signal of this sensor is then compared against a threshold value to determine when the mating member 120 is fully engaged in the docking target and thus 122 cannot move any further in the radial direction 116. The sensor and threshold value are selected such that when the mating member 120 becomes fully engaged with the docking target 122 then the output signal from the sensor exceeds the threshold value.

Figure 3:
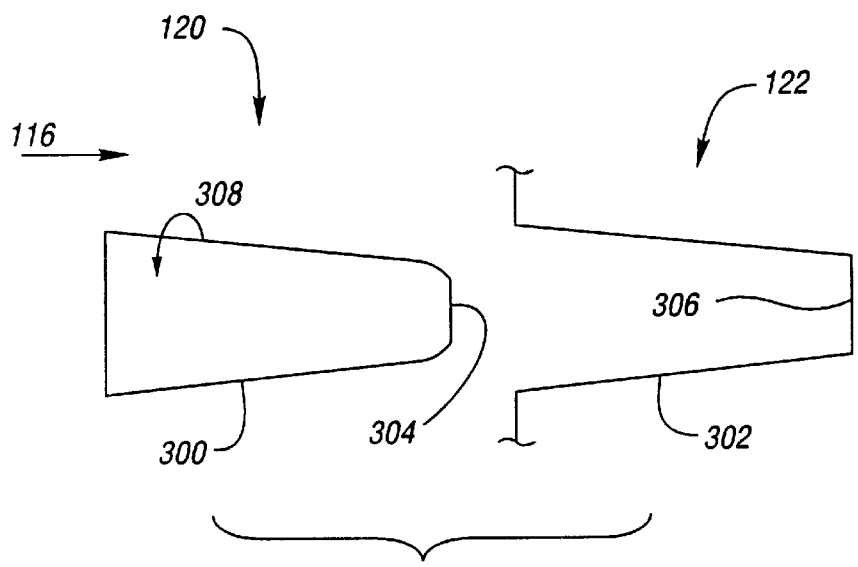
FIG. 3 is an elevated view of one embodiment of a docking target and a mating member.

The shape of the mating member 120 and docking target 122 may vary from application to application. FIG. 3 shows an example of a mating member 120 that is a conical plunger with tapered sides 300, and a docking target 122 that is a cavity with tapered walls 302. Tapering both the sides 300 and walls 302 helps reduce the friction between these two surfaces as one slides across the other during movement in the radial direction 116. Other variations (not shown) are possible where the sides 300 of the mating member 120 are not tapered and the walls 302 of the docking target 122 are tapered, or vice versa. In still other variations (not shown), the taper of the walls 302 may vary in the radial direction 116. What is important is that there is some relative taper between sides 300 and walls 302 that will cause the mating member 120 and docking target 122 to be self-aligning. Shallow tapers provide low sliding friction characteristics making it easier for drive mechanism 114 to engage and disengage the mating member 120 from the docking target 122. Steeper relative tapers allow coarser initial alignment but generate more friction.

Docking target 122 and mating member 120 may act as mechanical stops to halt movement in the radial direction 116 when alignment is reached. This function can be achieved by the shape of the docking target 122 with respect to the mating member 120. First, as mating member 120 is moved further inside docking target 122 the sides 300 engage walls 302 in more places. Eventually there is sufficient engagement between sides 300 and walls 302 to prevent any further movement of mating member 120 into docking target 122. This approach has a practical limitation when the taper of sides 300 and walls 302 are shallow with respect to the radial direction 116. If both tapers are too shallow, then static friction between sides 300 and walls 302 may cause the mating member 120 to frictionally lock in docking target 122. The second approach for limiting radial direction 116 movement is to blunt the leading edge 304 of the mating member 120 and create a back wall 306 inside the docking target 122. Movement in the radial direction 116 is now halted when the blunt leading edge 304 engages the back wall 306 at approximately a right angle. When mating member 120 is backed away from the docking target 122, there is no static friction between the leading edge 304 and back wall 306 to overcome, and the static friction between sides 300 and walls 302 can be kept to a minimum.

Many cross-sectional shapes may be used for docking target 122 and mating member 120. The cross-sectional shape may be round, triangular, square, rectangle, hexagonal, and so on. Cross-sectional shapes may also vary between the docking target 122 and mating member 120. For example, the docking target 122 may have a square cross-section, resulting in an inverted pyramidal shape, while the mating member 120 is conical with a circular cross-section. In the preferred embodiment, the cross-section of both the docking target 122 and mating member 120 are circular so they may be aligned at any relative roll direction 308.

The shapes of the docking target 122 and mating member 120 can be substituted for each other due to the symmetry in their interaction. A storage library system can be designed in which the docking targets protrude away from the cells 120 in a direction opposite radial direction 116, and the mating members 120 are cavities. Other designs may also be used where the docking targets 122 and mating members 120 have complementary shapes that both include some protruding sections and some recessed sections.

The position of the docking targets 122 with respect to the cells 102 impacts the storage space efficiency of the storage library system. Docking targets 122 may be above, below, to the sides of the cells 102, or in any combination. Side placement is efficient when there are a large number of cells in each column as compared with the number of columns in the storage library system. Placing docking targets 122 above and/or below each cell 102 is efficient when the number of cells in each columns are minimal and there are a large number of columns in the library.

Figure 4:
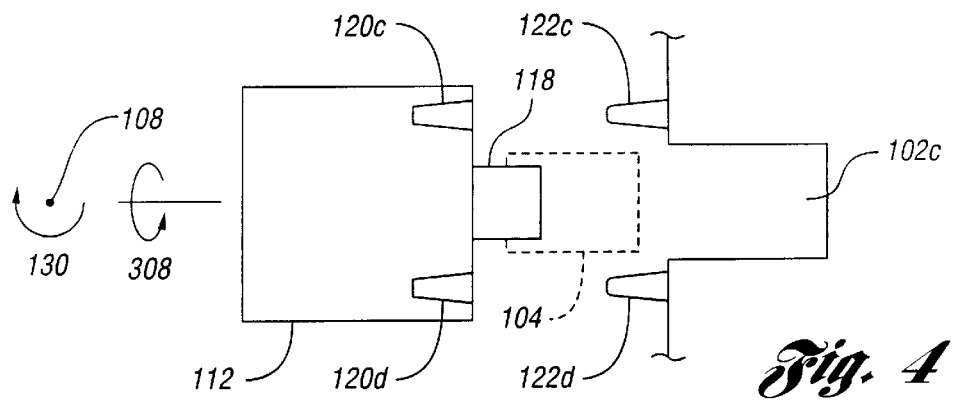
FIG. 4 is a fragmentary elevated top view of the robotic hand having two mating members, and one cell having two docking targets.

FIG. 4 is an example of a robotic hand 112 and cell 102c having two mating members 120c–d and two docking targets 122c–d respectively. The view of FIG. 4 is seen looking top-down along Z-axis 108. In this example, the docking targets 122c–d are plungers and mating members 120c–d are cavities. Use of two docking target 122c–d and mating member 120c–d pairs provides for alignment in the direction of the Z-axis 108, in the direction of angle theta 130, as well as the roll direction 308.

Figure 5:
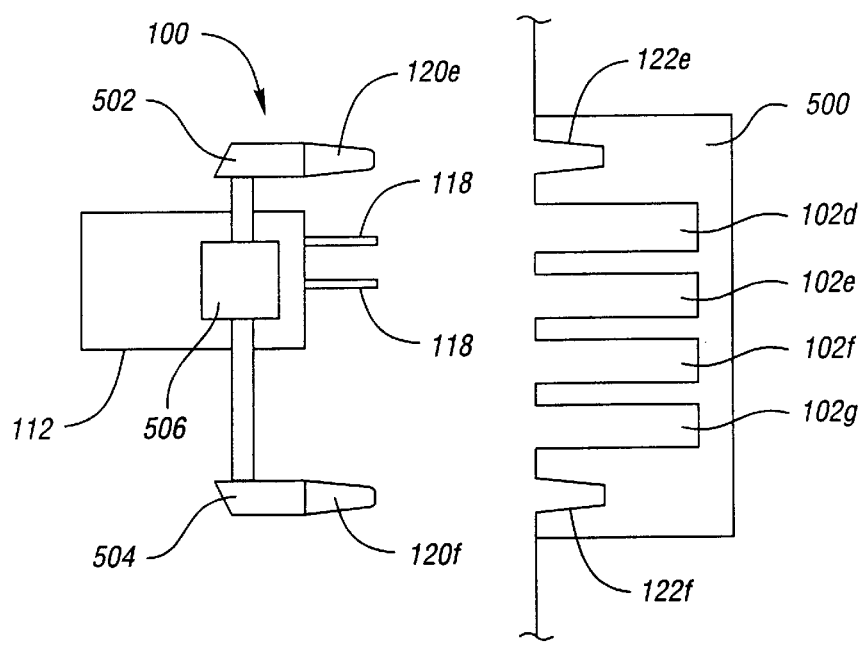
FIG. 5 is a fragmentary elevated side view of two mating members coupled to the robotic hand with a drive mechanism, and a magazine having two docking targets and four cells.

Modem storage library system designs use magazines to hold several cartridges simultaneously. These magazines are rigid so any mechanical misalignment of the magazine from its theoretical position results in the same misalignment for all of the cells within the magazine. This commonality within a magazine allows for a few, or even one docking member 122 to service the entire magazine. FIG. 5 is an example of a robotic assembly 100 and magazine 500 that implement this embodiment. Two docking members 122e–f are provided in magazine 500 along with multiple cells 102d–g. Two mating members 120e–f are coupled to robotic hand 112 through carriages 502 and 504 respectively, and drive mechanism 506. Drive mechanism 506 can change the relative positioning between the two mating members 120e–f and the robotic hand 112 when aligning the robotic hand 112 with cells 102d–g.

Operation of this configuration is the same as in FIG. 2 with one additional step. Before starting the robotic hand 112 in motion toward the selected cell, block 202 in FIG. 2, the drive mechanism 506 in FIG. 5 adjusts the relative position between the robotic hand 112 and the two mating members 102e–f by an ineger number of cell distance. The adjustment aligns the robotic hand 112 with the selected cell chosen from cells 102d through 102g with mating members 120e and 120f aligned to docking targets 122e and 122f respectively.

The example shown in FIG. 5 illustrates a typical magazine 500 having multiple cells 102d–g arranged in a column. This approach of variably positioning the mating members 120e–f with respect to the robotic hand 112 may also be used where the cells 102d–g in magazine 500 are arranged in a row. Drive mechanism 506 may be any type of mechanism that move carriages 502 and 504 along a straight line. Example types include screw drives, scissors drives and telescoping drive mechanisms.

Figure 6:
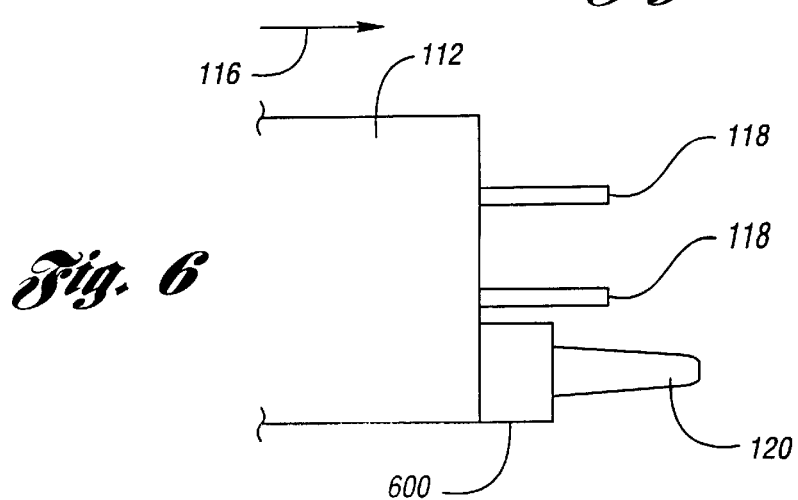
FIG. 6 is fragmentary elevated side view of the robotic hand and a mating member.

Beyond aligning and calibrating, the mating member 120 may also be used to examine cell 102 for the presence of a cartridge 104. Mating member 120 must extend in the radial direction 116 beyond the pair of grippers 118, as shown in FIG. 6, in order to support this function. This configuration allows the mating member 120 to be partially inserted into a selected cell 102 without the pair of grippers 118 colliding with a cartridge in the next cell above.

Referring to FIG. 7, the process of examining a cell 102 starts by aligning the mating member 120 with the selected cell 102, as shown in block 700. The robotic hand 112 is then moved so that the mating member 120 encroaches the space that would normally be occupied by a cartridge 104, if present in the selected cell 102, as shown in block 702. The encroachment position can be reached by attempting to move the robotic hand 112 to a predetermined absolute position, or by moving the robotic hand 112 at a predetermined rate until either a predetermined timer expires, or a sensor indicates that contact has been made. The sensor may be any one sensor or combination of the sensors discussed back in FIG. 2. Referring back to FIG. 6 momentarily, the preferred approach is to incorporate a sensor 600 that couples the mating member 120 to the robotic hand 112. Sensor 600 may be a pressure type sensor, a displacement type sensor, or the like. Returning to FIG. 7, the output signal of sensor 600 indicates contact or no contact with a stationary object, as shown by decision block 704. When sensor 600 indicates contact, then the storage library system concludes that there is a cartridge 104 in the selected cell, as shown in block 706. When sensor 600 indicates no contact, then the system concludes that the selected cell in empty, as shown in block 708.

The storage library system may remove a cartridge 104 detected in a selected cell 102 by backing the mating member 120 off of the cartridge 104 in a direction opposite the radial direction 116. The alignment process shown in FIG. 2 is executed to coarsely align, and then finely align the robotic hand 112 with the selected cell 102. After the robotic hand 112 is finely aligned with the selected cell 102, the pair of grippers 118 grip and hold cartridge 104. Drive mechanism 114 then backs the robotic hand 112 away from the selected cell 102 in a direction opposite the radial direction 116. As the robotic hand 112 moves back, cartridge 104 is removed from the selected cell 102 and mating member 120 disengages from the docking target 122. The robotic assembly 100 may move the cartridge 104 to any other location within the storage library system once the cartridge 104 is fully removed from the selected cell 102.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for aligning a robotic hand with a plurality of cells comprising:

at least one docking target disposed in a predetermined position with respect to the plurality of cells; and at least one mating member coupled to the robotic hand, the at least one mating member being engageable with the at least one docking target to align the robotic hand with a selected cell of the plurality of cells when the at least one mating member is engaged with a respective at least on docking target.

2. The apparatus of claim 1 further comprising at least one home docking target disposed at a calibration position with respect to the plurality of cells, the at least one mating member being engageable with the at least one home docking target to facilitate positional calibration of the robotic hand.

3. The apparatus of claim 1 further comprising a drive mechanism operative to couple the at least one mating member to the robotic hand, wherein the drive mechanism has a range of motion of at least one cell of the plurality of cells.

4. The apparatus of claim 1 wherein each docking target of the at least one docking target is a cavity and each mating member of the at least one mating member is a plunger receivable in the cavity.

5. The apparatus of claim 1 wherein each mating member of the at least one mating member is a cavity and each docking target of the at least one docking target is a plunger receivable in the cavity.

6. The apparatus of claim 1 further comprising a sensor disposed between the at least one mating member and the robotic hand for detecting when a selected cell of the plurality of cells contains a cartridge.

7. The apparatus of claim 6 wherein the sensor is selected from the group of sensors consisting of a pressure sensor, a position sensor, a velocity sensor, and an acceleration sensor.

8. The apparatus of claim 1 wherein the robotic hand includes a gripper mechanism and the at least one mating member extends beyond the gripper mechanism in a direction towards the plurality of cells.

9. The apparatus of claim 1 further comprising a timer for determining when the at least one mating member is aligned with the respective at least one docking target of the selected cell of the plurality of cells.

10. A system for storing and retrieving a plurality of cartridges from a storage library comprising:
    a column defining an axis;
    a plurality of cells disposed cylindrically about the column and spaced therefrom, the plurality of cells for storing the plurality of cartridges;
    a carriage coupled to the column, the carriage operative to move along the column parallel to the axis and to rotate about the axis;
    a robotic hand coupled to the carriage and operative to move radially with respect to the axis of the column for inserting and removing the plurality of cartridges from the plurality of cells;
    at least one docking target disposed in a predetermined position with respect to the plurality of cells; and
    at least one mating member coupled to the robotic hand, the at least one mating member being engageable with the at least one docking target to align the robotic hand with a selected cell of the plurality of cells when the at least one mating member is engaged with a respective at least on docking target.

11. The system of claim 10 further comprising at least one home docking target disposed at a calibration position with respect to the plurality of cells, the at least one mating member being engageable with the at least one home docking target to facilitate positional calibration of the robotic hand.

12. The system of claim 10 further comprising a drive mechanism operative to couple the at least one mating member to the robotic hand, wherein the drive mechanism has a range of motion of at least one cell of the plurality of cells.

13. The system of claim 10 wherein each docking target of the at least one docking target is a cavity and each mating member of the at least one mating member is a plunger receivable in the cavity.

14. The system of claim 10 wherein each mating member of the at least one mating member is a cavity and each docking target of the at least one docking target is a plunger receivable in the cavity.

15. The system of claim 10 further comprising a sensor disposed between the at least one mating member and the robotic hand for detecting when a selected cell of the plurality of cells contains a cartridge.

16. The system of claim 15 wherein the sensor is selected from the group of sensors consisting of a pressure sensor, a position sensor, a velocity sensor, and an acceleration sensor.

17. The system of claim 10 wherein the robotic hand includes a gripper mechanism and the at least one mating member extends beyond the gripper mechanism in a direction towards the plurality of cells.

18. The system of claim 10 further comprising a timer for determining when the at least one mating member is aligned with the respective at least one docking target of the selected cell of the plurality of cells.

19. The system of claim 10 further comprising a third sensor disposed between the robotic hand and the carriage for detecting when a selected cell of the plurality of cells contains a cartridge.

20. The system of claim 19 wherein the third sensor is selected from a group of sensors consisting of a pressure sensor, a position sensor, a velocity sensor, and an acceleration sensor.

21. A method of aligning a robotic hand having at least one mating member with a plurality of cells having at least one docking target, the method comprising:
    coarsely aligning the robotic hand with a selected cell of the plurality of cells;
    moving the robotic hand towards the selected cell of the plurality of cells after coarsely aligning the robotic hand with the selected cell to engage the at least one mating member with a respective at least one docking target associated with the selected cell of the plurality of cells, the engaging of the at least one mating member with the respective at least one docking target producing a fine alignment of the robotic hand with the selected cell of the plurality of cells; and
    stopping the robotic hand in response to the at least one mating member becoming fully engaged with the respective at least one docking target.

22. The method of claim 21 further comprising:
    aligning the at least one mating member with at least one home docking target prior to coarsely aligning the robotic hand with the selected cell of the plurality of cells, the at least one home docking target defining a calibration position;
    moving the robotic hand towards the at least one home docking target to engage the at least one mating member with the at least one home docking target, the engaging of the at least one mating member with the at least one home docking target producing a fine alignment of the robotic hand with the calibrated position; and
    stopping the robotic hand in response to the at least one mating member becoming fully engaged with the at least one home docking target.

23. The method of claim 21 further comprising positioning the at least one mating member an integer number of a cell distances away from the robotic hand prior to moving the robotic hand towards the selected cell of the plurality of cells.

24. The method of claim 21 further comprising detecting when at least one sensor exceeds a respective threshold for determining when the at least one mating member becomes fully engaged with any at least one docking target.

25. A method for determining when a selected cell of a plurality of cells is occupied by a cartridge using the at least one mating member protruding from a robotic hand, the method comprising:

aligning the at least one mating member with the selected cell of the plurality of cells;

moving the robotic hand to a predetermined position sufficient to cause the at least one mating member to contact the cartridge when the cartridge is present in response to aligning the at least one mating member with the selected cell of the plurality of cells; and determining that the cartridge is present in the selected cell of the plurality of cells in response to the at least one mating member contacting the cartridge when the robotic hand is moved to the predetermined position, and that no cartridge is present in the selected cell of the plurality of cells in response to the at least one mating member not contacting the cartridge when the robotic hand is moved to the predetermined position.

26. The method of claim 25 further comprising detecting when at least one sensor exceeds a respective threshold for determining when the at least one mating member is and is not contacting the cartridge.

* * * * *